United States Patent [19]

Roux

[11] Patent Number: 4,811,485

[45] Date of Patent: Mar. 14, 1989

[54] TOOL FOR DRESSING AN ELECTRIC CABLE

[76] Inventor: Robert Roux, 7 Rue Verte, Tuffe - 72160 Connerre, France

[21] Appl. No.: 116,334

[22] Filed: Nov. 3, 1987

[30] Foreign Application Priority Data

Nov. 27, 1986 [FR] France ............................. 86 16569

[51] Int. Cl.$^4$ ............................................. H02G 1/12
[52] U.S. Cl. ........................................................ 30/90.1
[58] Field of Search .................. 81/9.4; 30/90.1, 90.2, 30/90.3, 92

[56] References Cited

U.S. PATENT DOCUMENTS 2,752,676  7/1956  Trickle, Jr. ........................... 30/91.2
4,104,791  8/1978  Sunahara ............................. 30/90.1

FOREIGN PATENT DOCUMENTS 0070554  1/1983  European Pat. Off. .
1190071  10/1960  Fed. Rep. of Germany .
2121431  8/1972  France .

Primary Examiner—Roscoe V. Parker
Attorney, Agent, or Firm—Young & Thompson

[57] ABSTRACT

A tool for dressing an electric cable of the type comprising a body in which is provided a journaling passage for receiving the end of the cable to be stripped, said body having at least one cutter protruding over a settable distance inside the passage and including two cutting edges, one of which being substantially radial and the other one at the first cutting edge inner end being perpendicular to the passage axis, the body defining said passage via two adjacent blocks mobile with respect to one another. The surface of one of the body blocks forming the journaling guiding generating line or lines of the cable are engaged between the V-shaped surfaces forming on the body other block the opposite cable journaling guiding generating lines. The tool allows stripping with the same tool cables having a diameter between 15 and 65 mm.

8 Claims, 1 Drawing Sheet

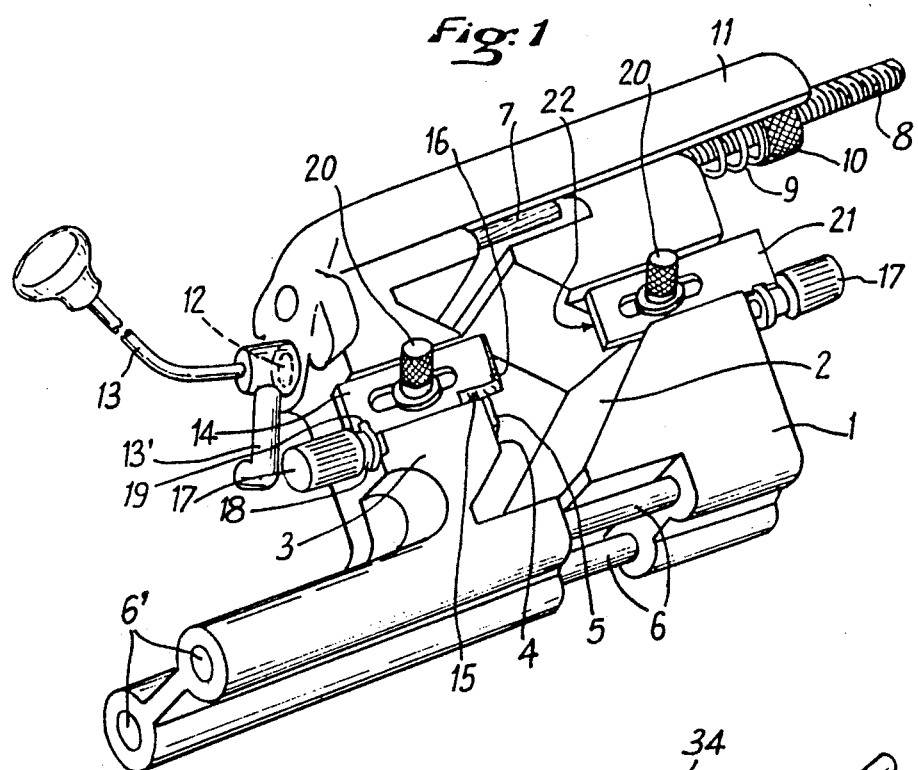
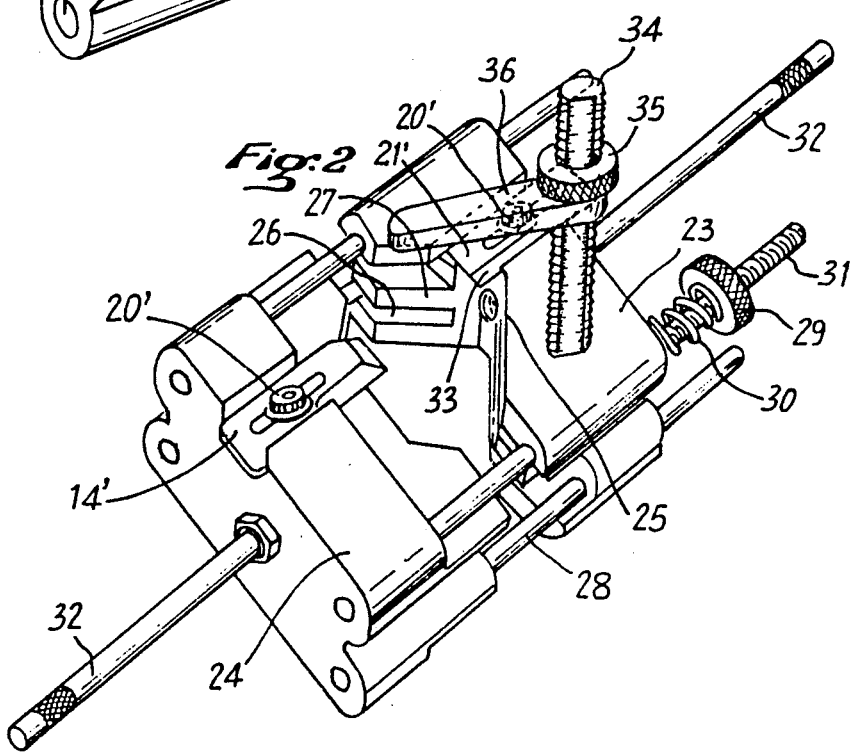

TOOL FOR DRESSING AN ELECTRIC CABLE

FIELD OF THE INVENTION

The present invention relates to the work done on electric cables, notably multiwire cables of large section, in order to eliminate the main insulating layer encasing the unit conducting wires which are themselves insulated in their own insulating layer.

BACKGROUND OF THE INVENTION

A tool for carrying out this work is disclosed in FR-A-2 121 431, said tool comprising a body in which is provided a journaling passage for receiving the end of the cable to be stripped, said body including at least a cutter protruding over a settable distance inside the passage and formed with two cutting edges, one substantially radial and the other at the inner end of the first cutting edge which is parallel to the passage axis. By rotating the tool about the cable, one cuts out, in the main insulating layer, a helical chip the thickness of which is set by the length of protrusion of the cutter inside the journaling passage.

It is obvious that in such a tool, the precision of the radial thickness of the cut-out insulation depends on the accuracy with which is set the length of protrusion of the cutter and the play eventually existing between the cable and the walls forming the journaling passage.

Yet, the cables have, according to the number and section of the unit conductors, very different diameters which vary practically from 15 to 65 mm.

In FR-A-2 121 431, this adaptation of the journaling passage to the cable diameter is obtained by forming the body defining this passage with two adjacent blocks mobile with respect to one another, the passage being formed by two grooves, preferably of V-shaped section, provided in the opposite surfaces of said blocks, one of said blocks being provided with at least two guiding rods on which slide the other block through corresponding holes, the two blocks being subjected to the action of resilient means biasing them apart while a setting nut screwed onto one of the rods, which is threaded, brings two blocks near each other against said spacing biasing force of the resilient means.

This embodiment of the body and notably of the journaling passage is such that the adaptation capacity of the tool to the various diameters of the cable is extremely reduced. Indeed, for centering the cable having its main insulation presenting some plasticity, it is necessary that the generating lines along which is carried out the guiding, viz. those which are bearing on the surfaces of the V-shaped grooves of the guiding body blocks, present a sufficient angular spacing. Moreover, it is obvious that if the blocks carrying the two V-shaped grooves can be sufficiently brought near to each other in order to adapt themselves around the cable of minimum diameter, when the cable has a maximum diameter the bodies will be in contact with the cable surface via the edges of the groove sides, thereby preventing the journaling. The making of a tool of this type, adaptable to the full range of cable diameters, seemed geometrically impossible due moreover to the necessity of fixing at the same time on the blocks the main cutter and either the cutter with a cutting edge in the opposite direction which is sometimes provided on the tool for cutting off by a reverse rotation the chip under which it is engaged during the normal rotation in order to lift it, or the abutment blade substituted thereto, and to set the length of protrusion of the cutters or abutment blade in the passage. In practice, it was therefore necessary to have at least two tools of this type for covering the whole range of usual diameters.

OBJECTS AND SUMMARY OF THE INVENTION

The aim of the present invention is to remedy this disadvantage and its object is a tool of the type hereabove mentioned, in which the surface of one of the body blocks which provides the generating line or lines for guiding the journaling motion of the cable is engaged between the V-shaped surfaces forming, on the other body block, the cable journaling guiding opposite generating lines.

Two embodiments are possible within the scope of the hereabove definition of the invention.

According to a first embodiment, the journaling guiding between the cable and the tool is a guiding according to three generating lines, one of the blocks having a groove of substantially V-shaped section and the other block a protrusion having substantially the same section so as to be able to engage inside the groove, the edge of said protrusion being truncated according to a transverse longitudinal plane for providing a sufficiently wide surface surrounding the bearing generating line which is situated in the median plane of the dihedron of the V-shaped groove. It is of course obvious with this embodiment that it is only necessary for the V-shaped groove of the first block to be sufficiently wide for the cable of largest diameter engaged therein to be bearing against the side surfaces of the groove and not against the edges, and for the protrusion of the other block to be sufficiently engaged within the groove so that the triangle remaining between its end transverse plane at the vertex of the dihedron of the V-shaped groove be smaller than the triangle escribed to the smallest cable section.

According to another embodiment, the journaling guiding between the cable and the tool is a guiding according to four generating lines distributed between two opposite dihedrons, the blocks forming each of said dihedrons in the shape of a V-shaped groove and the opposite portions of the blocks, on either side of said groove, being subdivided by off-set slots allowing the interengagement of the two blocks by a sliding fit of the blades separating said slots. In this embodiment, the journaling guiding is provided according to successive lengths in alignment of each generating line, each length corresponding to the thickness of a blade, and what is needed is that the V-shaped grooves of both blocks be sufficiently wide for the cables of largest diameter engaged therein to be bearing against the side surfaces of the blades of the groove and not against the edges and, at the maximum interengagement of the block blades, the lozenge defined between the two dihedrons be smaller than the lozenge of same angles at the escribed vertexes to the section of the cable of smallest diameter.

As regards this second embodiment, there has already been disclosed in DE-B-1 190 071 an apparatus for dressing an electric cable which includes a clamping jaw made of two blocks forming two V-shaped opposite dihedrons, the opposite portions of the blocks being subdivided by off-set slots for the interengagement of the blocks by a nesting of the blades separating said slots. In this patent, the hereabove clamping jaw is a clamping jaw provided not for rotatably guiding the cable, but for securing it against rotation and the blades which are interpenetrating each other are sufficiently spaced apart for deforming the cable when clamping it according to a sinusoid lying in the plane passing by the edges of the dihedron. Therefore, this document cannot suggest a journaling guiding device since its object is on the contrary a clamping member deforming the cable for securing it against rotation.

According to another feature of the invention, the setting of the radial length of protrusion of the cutter or cutters is carried out by a screw of the so-called micrometric type in which the rotation of a knurled nut moves the cutter forewardly or rearwardly.

According to another feature, an abutment, mobile along a rod rigid with one of the blocks and parallel to the cable axis, is settable, preferably by means of a micrometric screw, in order to limit the length of the stripped cable by abutting against the cable end.

BRIEF DESCRIPTION OF DRAWINGS

Other features of the invention will become more apparent from the reading of the detailed description of two embodiments of the tool according to the invention, with reference to the accompanying drawings wherein:

FIG. 1 is a perspective view of the tool according to a first embodiment, and

FIG. 2 is a view corresponding to FIG. 1 of a second embodiment provided with a setting abutment for the stripped cable length.

DETAILED DESCRIPTION OF THE INVENTION

In FIG. 1, reference numeral 1 designates the body block formed with a V-shaped groove 2 and reference numeral 3 the complementary block. According to the invention, said block 3 carries a prismatic protrusion of same section as groove 2, the end of said prismatic protrusion of block 3 which is opposite said groove being truncated at 4 so as to form a plane surface possibly including a relieved central portion 5 forming the contact generating line between block 3 and the cable, said cable being enclosed between said surface 5 and the two surfaces of the V-shaped groove 2.

Since usually the two blocks are guided with respect to one another on the one hand by rods 6 which are slidably engaged inside tubular channels 6' rigidly connected to the other block, and on the other hand by a rod 7 rigidly connected to one of the blocks and sliding in a hole of the other block, the end of said rod being threaded at 8 in order to provide for the movement toward each other of the two blocks via a spring 9 interposed around said rod between the rear face of block 1 and the knurled nut 10 which is screwed onto the threaded end.

Threaded portion 8, spring 9 and knurled nut 10 are protected by a gutter 11 rigidly connected to the opposite block, with a threaded hole 12 being provided at the other end of said gutter for the fixation of an operating handle 13 which can be locked in position by a lever nut 13'.

On body 3 is slidably mounted in a slide a cutter 14 having two cutting edges, one 15 oriented toward the edge of dihedron 2, viz. radially with respect to the cable set in position in the tool, and the other 16 perpendicular thereto. Said cutter is of known type and its length of protrusion with respect to the bearing face 5 is settable by means of a knurled nut 17 having a collar 18 engaging into a groove 19 at the rear of the cutter blade, the cutter being locked in position after setting by a setting screw 20. Opposite and above the edge of the dihedron formed by the V-shaped groove 2 is fixed a blade 21 with the end 22 of which forming an abutment for the stripped portion of the cable. The position or the radial length of protrusion of said blade 21 is also settable by means of a knurled nut 17 and lockable in position by means of a screw 20.

Said screw provides for the guiding of the tool on the cable along three generating lines and the minimum diameter of the cable which it is capable to strip corresponds to the escribed triangle remaining between surface 5 and the two faces of the V-shaped groove 2 when the side faces of the prismatic protrusion of block 3 are bearing against said surfaces of the V-shaped groove 2. The maximum diameter of the cable which it is possible to strip corresponds to a circular section which has in practice as diameter the distance between the edges of the V-shaped groove 2. In practice, said diameter can be between 15 and 65 mm.

In the embodiment of FIG. 2, blocks 23 and 24 are substantially of same shape and are formed on their opposite faces with V-shaped grooves 25 with the edge at the bottom of the dihedron being truncated. According to the invention, the two blocks 23 and 24 include on their opposite faces a slot such as 26 forming blades 27. Blades 27 of one of the bodies are engaged within the slots 26 of the other when the two bodies are brought close to each other. This allows reducing the journaling guiding section until the end of blades 27 of one of the blocks comes in abutment in the bottom of grooves 26 of the opposite block.

In the embodiment of FIG. 2, the sliding of blocks 23, 24 with respect to one another is guided in known manner by rods 28 rigidly connected to one of the blocks, in the present case block 24, and slidably engaging inside holes of the other block, in this case block 23. The movement of the two blocks toward each other is set by a knurled nut 29 and a spring 30, the knurled nut being screwed onto the threaded end 31 of one of rods 28. Reference numeral 32 designates operating rods for rotating the tool about the cable to be stripped. Reference numeral 14' designates the main cutter which is in all respects similar to the hereabove cutter 14 with the exception of the fact that it does not include device 17-19 for setting its length of protrusion, but only a locking screw 20'. Plaquette 21 is replaced by a cutter 21' maintained in position in the same manner by a locking screw 20' and said cutter is formed with an edge 33 oriented in known manner in the reverse direction to that of the normal rotation in order to cut off the chip after the stripping operation and by a reverse rotation over one turn.

Moreover, the tool of FIG. 2 is formed in its upper face carrying the cutter of block 23 a threaded hole for the fixation, parallel to the journaling guiding passage axis, of a rod 34 on which moves a micrometric nut 35 which is rigidly connected for a longitudinal displacement along rod 34 of a radial plaquette 36' maintained oriented by flats of rod 34 so as to be permanently above the journaling passage axis. Thus plaquette 36 forms an abutment for the end of the cable stripped portion and allows previously setting the length of said stripped portion.

The embodiments hereabove described can receive many modifications without departing from the scope of the present invention.

I claim:

1. A tool for dressing an electric cable comprising a body in which is provided a journaling passage for receiving the end of a cable to be stripped, said body including at least one cutter extending across said passage over a settable distance and having two cutting edges, one cutting edge being substantially transverse to said passage and the other cutting edge being adjacent the first cutting edge and perpendicular to the passage axis, said body comprising two opposing blocks movable with respect to one another and defining between them said journaling passage, wherein at least one of said opposing body blocks includes a notched portion which defines a lateral extent of the journaling passage and the other of said opposing body blocks includes an opposing surface which defines an opposing lateral extent of said passage and which, upon movement of said blocks toward each other, extends into said notched portion of said opposing body block.

2. A tool according to claim 1, wherein one of said body blocks includes a notched portion which is substantially V-shaped in configuration and the opposing surface of said adjacent body block which extends into said V-shaped portion comprises an inverted V-shaped portion of such configuration to permit said portions to cooperatively engage, said inverted V-shaped portion having a truncated end surface so as to provide a cable bearing surface along the axis of said passage.

3. A tool according to claim 2, wherein one of said at least one cutter extends across said passage from said truncated end surface.

4. A tool according to claim 1, wherein each of said body blocks includes a notched portion, with said blocks each including off-set grooved portions which permit said blocks to interengage one another upon movement of said blocks toward each other, while permitting one of said notched portions to extend into said other opposing notched portion.

5. A tool according to claim 4, wherein one of said notched portions includes a rearwardly-disposed truncated surface which provides a cable bearing surface along the axis of said passage.

6. A tool according to claim 5, wherein one of said at least one cutter extends across said passage from said truncated end portion.

7. A tool according to claim 1, including micrometric type screw means to adjust the positioning of said at least one cutter.

8. A tool according to claim 1, further including abutment means against which an end of said cable abuts to limit the length of said cable which is stripped by said tool.

* * * * *